Sept. 27, 1932. J. A. McGREW 1,880,144
AUXILIARY PROPULSION UNIT
Filed Nov. 14, 1930 3 Sheets-Sheet 3
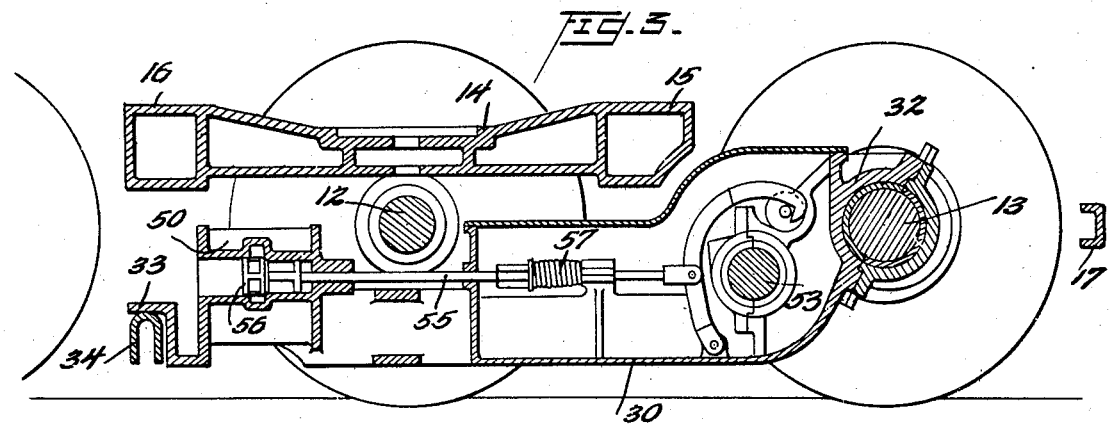
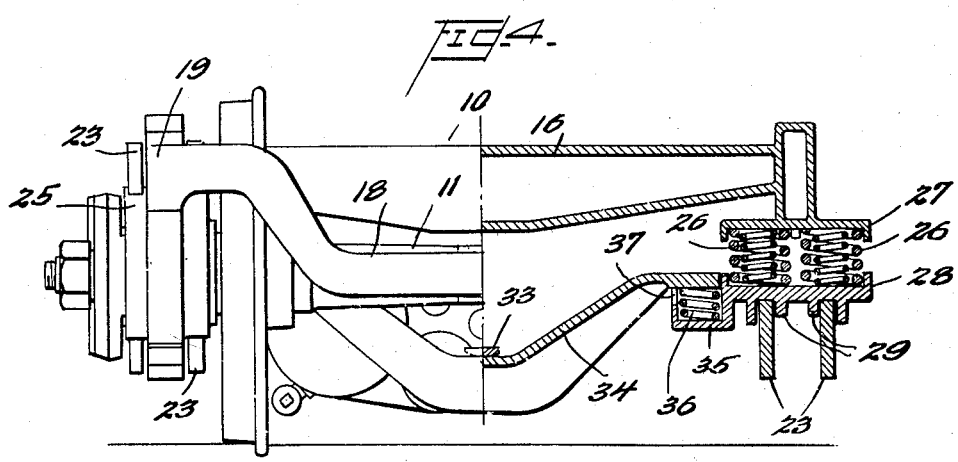
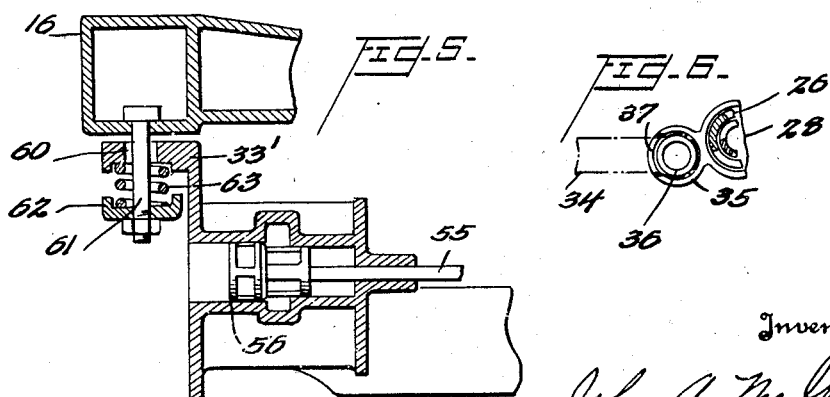
Inventor
John A. McGrew,
By Watson, Coit, Morse & Grindle
Attorneys Patented Sept. 27, 1932

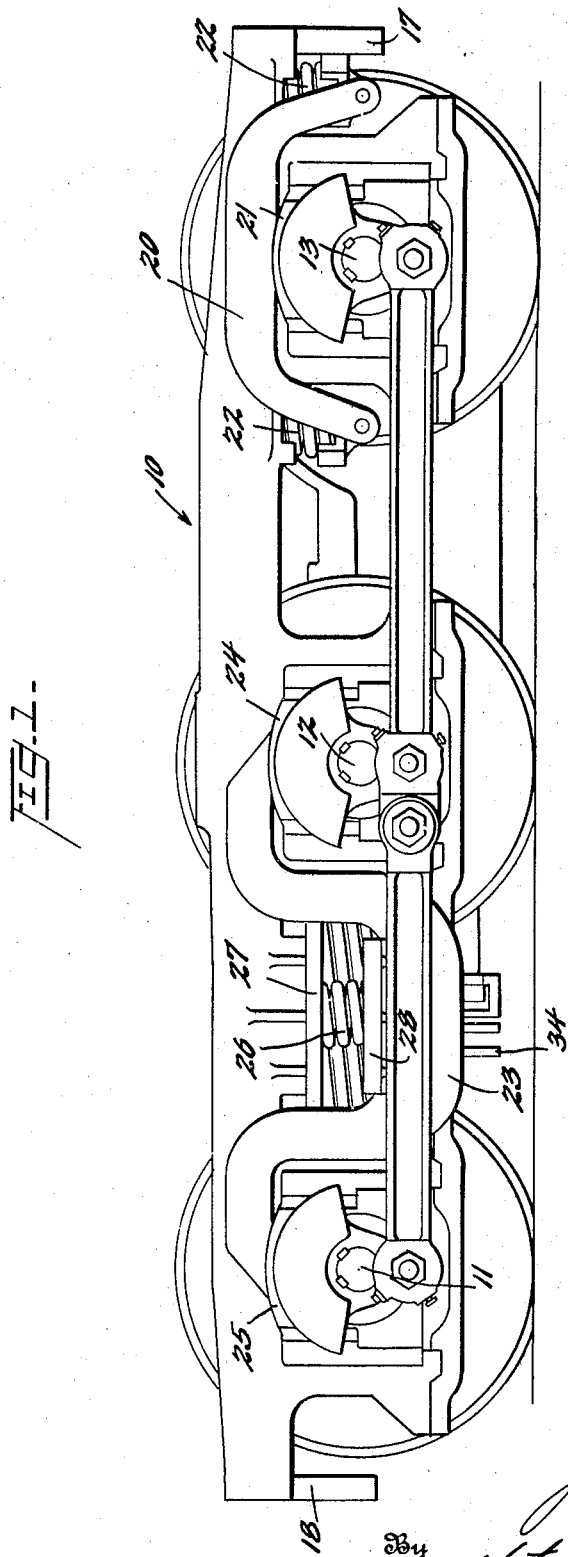

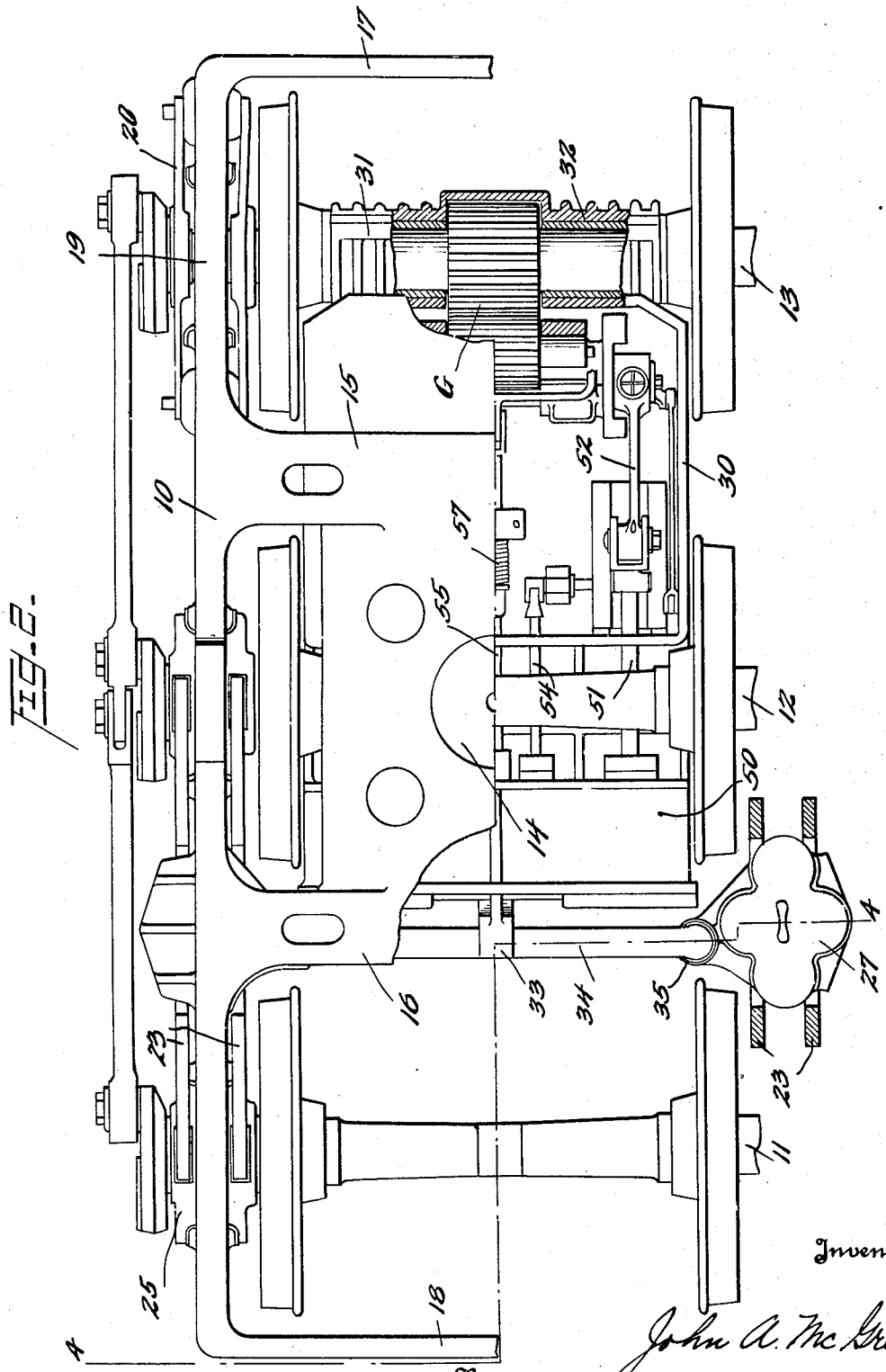

1,880,144

UNITED STATES PATENT OFFICE

JOHN A. McGREW, OF ALBANY, NEW YORK

AUXILIARY PROPULSION UNIT

Application filed November 14, 1930. Serial No. 495,772.

The present invention relates to auxiliary propulsion units and particularly to the type of auxiliary propulsion unit in which the motor, and the frame upon which it is mounted and supported, are in turn mounted upon a six-wheeled truck having three spaced axles.

The auxiliary propulsion motors now in common use are mounted either upon the trailer trucks of locomotives or upon locomotive tender trucks. It is highly desirable to utilize the dead weight of the locomotive tender as an aid in increasing the possible tractive effort of a locomotive by mounting an auxiliary propulsion unit beneath the tender. With the constant increase in size of locomotives and tenders, however, the problem of supporting the auxiliary propulsion motor and its frame beneath a tender truck has increased in difficulty.

The present invention relates particularly to the means for supporting an auxiliary propulsion motor and its frame beneath a truck of the six-wheeled type so that a motor of relatively large size and great power can be placed in the relatively small space available. Heretofore it has been considered necessary to either support the auxiliary propulsion motor and its frame at the end of the truck instead of between the axles or, when placed between the outside axles, in such manner that no portion of the frame extended over or under the middle or intermediate axle.

I have now devised, however, a novel motor frame and means of support therefor which permits a motor of large size and great power to be positioned beneath the truck frame of a six-wheeled truck, the various parts being so designed that the motor frame extends under the intermediate axle without interference between any part of the frame or operating parts of the motor with the axle. The motor frame is preferably supported at two points from one of the outside axles, at one end, and its other end is supported from the truck frame itself at a point between the intermediate axle and the second outside axle. This method of support is highly advantageous while at the same time is of great simplicity. The end of the motor frame which is supported directly from the truck frame may be suspended therefrom in various ways, and in the accompanying drawings I illustrate two alternative forms of such suspension. Other suspending means, however, might be devised.

In the drawings:

Figure 1 is a side elevation of the truck;

Figure 2 is a top plan view of the same, partly broken away to show certain of the operating parts of the auxiliary propulsion motor and the entrainment mechanism;

Figure 3 is a partial longitudinal section taken centrally of the truck;

Figure 4 is a view partly in end elevation and partly in section, as indicated by the line 4—4 of Figure 1;

Figure 5 is a section through an alternative form of motor frame suspending means, and Figure 6 is a plan view of a detail.

The truck frame itself is generally indicated at 10 and the three spaced axles at 11, 12, and 13, respectively. The truck frame centering plate is indicated at 14, the bolsters at 15 and 16, the end cross members at 17 and 18, and one of the wheel pieces at 19. It will be understood that there are two of these wheel pieces and that the truck frame is symmetrically formed about its longitudinal central axis. The weight of the truck frame and the load imposed thereon through the centering plate 14 by the tender or other car body above the same is transmitted to the three axles through equalizing mechanism. This equalizing mechanism includes spaced, parallel, U-shaped levers 20 symmetrically disposed above axle 13, at the ends thereof, each of these levers having a central point in contact with an axle block 21. Load is transmitted to these levers through coiled compression springs 22.

The axles 11 and 12 are equally loaded by equalizing levers 23, there being four of these levers arranged in parallel and grouped in pairs on opposite sides of the truck. Each of the levers is generally U-shaped, as can be seen from Figure 1, its ends resting upon axle boxes 24 and 25, respectively, and the load from the truck frame being transmitted thereto by groups of springs. Thus, on each side of the truck are provided four coiled compression springs 26, the upper ends of which bear against the lower surface of a horizontally disposed plate 27 formed integral with the truck frame, and the lower ends of which bear against the horizontally disposed upper surface of a bracket or spring abutment 28, each of these brackets resting upon the central portions of two equalizing levers 23, as can be seen clearly from Figure 4. Downwardly projecting lugs 29 of brackets 28 prevent lateral movement or displacement of the brackets.

The auxiliary propulsion motor frame is generally indicated at 30, this frame preferably comprising an integral casting insofar as is possible. One end of the frame is supported upon axle 13 by means of spaced bearings 31 and 32. From axle 13 the frame extends forwardly and passes under axle 12, as is clearly shown in Figures 2 and 3, and the forward end of the frame is located beneath transom 16 of the truck frame. The forward end of the motor frame terminates, in the case of the form of the invention shown in Figures 1 to 4, inclusive, in a horizontally projecting extension 33, and this extension in turn rests upon the central point of a transversely extending supporting or equalizing beam 34. From its central point this beam inclines upwardly and outwardly to both sides, as shown in Figure 4, and terminates in portions which extend substantially horizontally. These end portions of beam 34 project over cup-like extensions 35 of brackets 28, and in the recesses within these cup-like extensions are positioned coiled compression springs 36 which resiliently support the ends of beam 34. Beneath the ends of beams 34 the walls of the cup-like bracket extensions are cut away, as at 37, so that the beam ends may rise and fall relatively to the brackets 28, in the ordinary running of the truck, without these beam ends being caused to strike any portion of the spring support.

The motor frame is therefore suspended at three points, that is, at two spaced points on one of the outside axles and at a single point centrally of the truck at a point between the intermediate axle and the second outside axle. At the end remote from axle 13 the motor frame is resiliently supported so that it may move upwardly or downwardly through limited distances when the truck is traveling over a rough track, thereby cushioning the motor frame and the operating parts of the motor.

It is unnecessary to describe in detail the construction of the motor frame and the motor itself, but the principal portions of the motor and frame will be briefly referred to. The steam cylinders are preferably cast integral with the frame and are located at one end, one of the cylinders being indicated at 50 in Figure 3. A piston rod is indicated at 51, a connecting rod at 52, crankshaft at 53, and entrainment gearing generally at G. It will be understood that the motor includes two cylinders, with identical parts, one on each side of the truck. One of the valve rods is indicated at 54 and a plunger operated rod at 55, this last mentioned rod being adapted to be moved by a steam actuated plunger 56 in one direction, and a spring 57 in the opposite direction, to effect entrainment and disentrainment of the gearing G. From an inspection of Figures 2 and 3, it will be observed that the motor frame and motor operating parts are so designed and positioned so that, where they pass under the intermediate axle 12, there is ample clearance between the axle and the various parts of the motor and its supporting frame.

In Figure 5 an alternative way of supporting one end of the motor frame from the truck at an single point is disclosed. It will be understood that all of the remaining parts of the truck, motor frame, and motor are the same as before. In this instance, however, the horizontal, forwardly extending projection 33′ of the motor frame is positioned relatively close to the bolster 16 of the truck frame and is formed with an aperture 60. A bolt 61 has its head within transom 16 and supports at its lower end a spring abutment 62. Intermediate the upper surface of this spring abutment 62 and the lower surface of the extension 33′ is positioned a coiled compression spring 63 which resiliently supports the end of the truck frame.

It will be obvious, of course, that other forms of resilient means for supporting the end of the motor frame may be devised without departing from the spirit and scope of the invention and that, in adapting the invention for utilization with trucks of various types, one skilled in the art may make minor changes without departing from the principle of the invention.

Having thus described the invention, what is claimed as new and desired to be secured by Letters Patent is:—

1. An auxiliary propulsion unit comprising a truck frame, three spaced axles, equalizing levers extending from one outside axle to the intermediate axle, a motor frame beneath the truck frame and having one end thereof positioned intermediate the equalizing levers, and a transverse beam having its ends supported from the equalizing levers and connected to the end of the motor frame, for supporting the same.

2. An auxiliary propulsion unit comprising a truck frame, three spaced axles, equalizing levers extending from one outside axle to the intermediate axle, a motor frame beneath the truck frame and having one end thereof positioned intermediate the equalizing levers, and a transverse beam having its ends resiliently supported from the equalizing levers, an intermediate portion of said beam extending under and supporting the end of the motor frame.

3. An auxiliary propulsion unit comprising a truck frame, three spaced axles, equalizing levers extending from one outside axle to the intermediate axle, brackets positioned upon the said levers intermediate their ends respectively, a motor frame beneath the truck frame and having one end thereof positioned intermediate the equalizing levers, and a transverse beam having its ends resiliently supported from the equalizing levers and connected to the end of the motor frame, for supporting the same.

4. An auxiliary propulsion unit comprising a truck frame, three spaced axles, a motor frame, a motor mounted on the frame including steam cylinders, pistons therein, a crankshaft, and means connecting the pistons and crankshaft, said means being positioned beneath the intermediate axle, means supporting one end of the motor frame from an outside axle, and means for supporting the opposite end of the motor frame from the truck frame.

5. An auxiliary propulsion unit comprising a truck frame, three spaced axles, a motor frame below the truck frame, said motor frame being supported at one end at two spaced points upon one of the outside axles, and its opposite end supported from the truck frame at a point between the intermediate axle and the second outside axle.

6. An auxiliary propulsion unit comprising a truck frame, three spaced axles, a motor frame below the truck frame and having a portion thereof on each side of the intermediate axle, said frame having one end supported on one of the outside axles, and means supporting the other end of the motor frame from the truck frame at a point between the intermediate axle and the other outside axle.

7. An auxiliary propulsion unit comprising a truck frame, three spaced axles, a motor frame below the truck frame and having a portion thereof on each side of the intermediate axle, said frame having one end supported on one of the outside axles, and a beam extending transversely of the truck frame and having its ends supported therefrom for supporting the other end of the motor frame, said beam being positioned between the intermediate axle and the other outside axle.

8. An auxiliary propulsion unit comprising a truck frame, three spaced axles, a motor frame below the truck frame and having a portion thereof on each side of the intermediate axle, said frame having one end supported on one of the outside axles, and a beam extending transversely of the truck frame and having its ends supported therefrom through resilient members, for supporting the other end of the motor frame, said beam being positioned between the intermediate axle and the other outside axle.

9. An auxiliary propulsion unit comprising a truck frame having spaced bolsters and three spaced axles, one of said bolsters overlying the space intermediate two of said axles, and a motor frame below the truck frame, said motor frame passing beneath the intermediate axle and having its ends supported by said bolster and the outside axle remote therefrom.

10. An auxiliary propulsion unit comprising a truck frame, three spaced axles, and a motor frame below the truck frame, one end of the motor frame being supported upon an outside axle, the other end being supported from the truck frame by resilient means, and the motor frame extending beneath the intermediate axle so that said axle is intermediate the ends of said motor frame.

In testimony whereof I hereunto affix my signature.

JOHN A. McGREW.